Patented Mar. 1, 1949

2,463,224

UNITED STATES PATENT OFFICE 2,463,224

PROCESSING AGENTS FOR SYNTHETIC ELASTOMERS

John R. Vincent, Wilmington, Del., assignor to E. I. du Pont de Nemours & Company, Wilmington, Del., a corporation of Delaware No Drawing. Application July 11, 1944,
Serial No. 544,457

5 Claims. (Cl. 260—86.5)

This invention relates to the preparation of processing agents for improving the processability of butadiene-styrene elastomers.

In attempting to replace natural rubber with the synthetic rubbers such as Buna S, GR-S, Hycar OS 10, Hycar OS 20, etc., which are butadiene-styrene elastomers, one of the major problems has been the working of such synthetic elastomers on the usual rubber working machinery. The working of such synthetic rubbers, even where it is possible to carry it out on the usual rubber machinery, requires excessive time to effect the break-down or to properly compound the same with the necessary compounding materials. Where long periods of working are required to effect the desired result, the volume output per unit of equipment is necessarily low, and the power consumption unduly high.

It is known that, by adding certain aromatic mercaptans of the benzene and naphthalene series to synthetic rubbers in which butadine is the main polymerizable component, or when an unsymmetrical hydrazine is added to such polymers, the processability of the resulting elastomers is materially improved; see, for instance, U. S. P. 2,316,949 and German Patent 702,209. More recently, it has been found that other compounds, such as nitroso benzene compounds, benzoyl peroxide, etc., when added to butadiene-styrene elastomers, improve the processability of such material. The above named materials have been employed in small amounts, for example, two or three parts per hundred parts of elastomer.

It is therefore an object of this invention to provide processing agents which, when added to butadiene-styrene elastomers, will improve the processability of such elastomers so that they can be more readily and quickly processed with the machinery ordinarily employed in the processing of natural rubber. It is a further object of the invention to prepare new processing agents from compounds heretofore employed for the same purpose, but which new products have materially increased effectiveness.

I have found that very effective new processing agents may be made by intimately mixing known plasticizing agents, such as para-nitrosodimethylaniline, nitroso-beta-naphthol, phenylhydrazine, benzoyl peroxide and thio-alpha-naphthol, with small amounts of butadiene-styrene elastomer and exposing the mixture to air or oxygen until it is altered to a thick, viscous, tarry liquid. The processing agent of the group above mentioned is preferably employed in an amount equal to from 25% to 200% by weight, based on the butadiene-styrene elastomer with which it is incorporated, and the reaction is preferably carried out in an inert solvent.

As will be illustrated by the following examples, where an amount of this new processing agent is employed equal to a similar weight of the chemical compound from which it was prepared, a very marked decrease in milling time is noted, although a considerably less amount of the chemical compound itself is actually employed. The new processing agent is preferably employed with the butadiene-styrene elastomer to be treated in an amount of from 0.05% to 10% of the weight of the elastomer.

The processing agent of this invention is preferably produced by making a smooth cement of the butadiene-styrene elastomer, such as GR-S, in an inert solvent, such as aromatic hydrocarbon solvents or saturated hydrocarbon solvents, adding 25% to 200% by weight, based on the elastomer employed, of an organic compound of the class consisting of para-nitroso-dimethylaniline, nitroso-beta-naphthol, phenylhydrazine, benzoyl peroxide and thio-alpha-naphthol, refluxing the cement in the presence of oxygen, and then removing the solvent. The resulting products have in each case little, if any, of the rubbery properties of the original GR-S. The degree to which the rubbery properties of the GR-S have disappeared depends upon the amount of the organic compound used and on the length of time during which the mass was refluxed.

The amount of solvent employed in producing the cement may be varied to give cements giving a butadiene-styrene elastomer concentration of from 1% to 25% by weight, for, as illustrated, the solvent is evaporated off in the end, leaving the effective processing agent free of solvent. Such solvents as benzene, xylene, toluene, saturated aliphatic solvents and chlorinated hydrocarbon solvents may be used, and the elastomer may be broken down by any of the usual methods employed in producing smooth cements. The temperature of the reaction may vary from between 50° and 150° C., or even higher, although reflux temperatures are preferred because of the mixing action resulting during the boiling operation. Mechanical agitators, however, may be employed to effect a similar result. The time required to effect the preparation of these processing agents will vary, depending upon the particular organic compound which is being reacted with the polymer, and may be from 3 to as high as 96 hours.

As an alternative method for producing these new processing agents, these same organic compounds may be incorporated with butadiene-styrene elastomer by a milling or mixing operation in the absence of a solvent, such as by working on a rubber mill or in an internal mixer. The time required to produce the processing material by the dry milling process, however, is many times longer than that required when it is heated in the presence of an organic solvent, and therefore the solvent method is preferred.

In the milling or working of the organic compound of the class above described, with the relatively small amount of the butadiene-styrene elastomer, it appears that a chemical reaction takes place for the resulting materials exhibit no rubber-like properties, being thick, viscous, tarry liquids. In the case of the phenylhydrazine particularly, a gas is evolved which would indicate that some chemical reaction is taking place. This evolution of gas is less pronounced with the other compounds, although the resulting products exhibit similar properties. In each case the effectiveness of the new processing agents appears to increase upon standing for from one to three days, although on further standing the effectiveness may decrease, for it has been noted that after standing for five days the effectiveness of the para-nitrosodimethylaniline-butadiene-stryene processing agent was not as great as when it had stood for only two days. In all cases, however, a given weight of the new processing agent of this invention is more effective than the same weight of the chemical compound used in its preparation. The exact chemical nature of the active ingredients of these new processing agents is not known, for it has been impossible to separate the materials into identifiable components. It is therefore understood that, where the expression "reaction products" is used throughout this application, it is intended to identify the materials more specifically disclosed, irrespective of the specific chemical constitution of the resulting product.

The following examples are given to illustrate the invention. Parts used are by weight, unless otherwise specified.

EXAMPLE 1

Ten (10) grams of GR-S (lot 3 from manufacturer B) was heated with 500 cc. of benzene until a smooth cement was obtained. Then 10 grams of para-nitrosodimethylaniline was added to the cement and the mixture was heated at refluxing temperature for 22 hours in the presence of air or oxygen. At the end of this time the benzene was evaporated off, leaving 21.8 grams of a brown tarry viscous liquid.

EXAMPLE 2

A procedure similar to Example 1, but using 10 grams of phenylhydrazine in place of the para-nitrosodimethylaniline and reacting the mixture for 72 hours instead of 22 hours, resulted in a very viscous, sticky liquid. If such a mixture is refluxed for only 24 hours, the resulting product slowly evolves a gas for several days after the benzene has been removed.

EXAMPLE 3

Another run carried out as illustrated in Example 1 but using 10 grams of a mixture containing 50% of aromatic mercaptans (chiefly thio-alpha-naphthol) and 50% inert oil, and refluxing for 24 hours, yielded a viscous liquid weighing 17.8 grams.

EXAMPLE 4

Using 10 grams of GR-S (lot 3 from manufacturer B) and 3.6 grams of nitroso-beta-naphthol and following the procedure as in Example 3, yielded 14 grams of a brown, viscous product.

EXAMPLE 5

A similar run was carried out, using 10 grams of GR-S (lot 3 from manufacturer B) and 10 grams of dibenzoyl peroxide in 500 cc. of benzene, yielded a product that is similar in nature to that obtained in Example 4.

Following the procedure indicated in Example 1 but using only 10 grams of GR-S (no organic compound added) and refluxing for 23.5 hours, produced a product which had the properties and appearance of the original sample of GR-S, thus showing that in the presence of the subject compounds the GR-S is radically affected by the described process and that it is not so affected in their absence.

EXAMPLE 6

To 50 parts of GR-S on a rubber mill, was added 12.5 parts of phenylhydrazine, and the mixture was milled to uniformity on a 70° mill. The resulting soft elastomer, after standing overnight, had developed a very sticky, semi-liquid surface layer and was slowly evolving a gas. On further standing, this change penetrated throughout the sample, resulting in a brown viscous liquid which continued to evolve gas for several weeks. After one day at room temperature, a sample was tested and was found to improve the processability of a fresh sample of GR-S.

The effectiveness of these new processing agents is illustrated by the following tests, wherein they were incorporated into butadiene-styrene elastomers to improve their precessability.

Fifty (50) grams of the same lot of GR-S as employed in Example 1 was placed on a rubber mill having rolls 6 inches long and 2 inches in diameter, running at the same speed. The mill rolls were set 0.030 inch apart and were kept at 70° C. The GR-S was milled until a band was obtained that was free of holes for at least the time required for one revolution of the mill roll. This required 16 minutes. Then 50 grams of the same lot of GR-S and 0.5 gram of the product made as described in Example 1 were worked on the same mill under identical conditions. The time required to produce a band free of holes was 4 minutes. This amounts to a reduction of 75% in milling time.

The following table shows the results obtained using the product produced from para-nitrosodimethylaniline and GR-S of Example 1. A run using the para-nitrosodimethylaniline, that has not been treated with the elastomer to give the processing agent of this invention, is included for comparison.

Table I

|  | Percent Added | Percent Reduction in Milling Time |
|---|---|---|
| Product prepared from para-nitroso-dimethylaniline (1 part)+GR-S (1 part) | 4 | 84 |
| Do | 1 | 75 |
| Do | 0.5 | 66 |
| para-Nitrosodimethylaniline | 4 | 19 |

The great advantage of using the product obtained as described above, over using the untreated para-nitrosodimethylaniline, is obvious. For example, 0.5% of the processing agent of this invention, which contains only 50% of para-nitrosodimethylaniline, is more than three times as effective as 4% of para-nitrosodimethylaniline alone.

The effect of this material on GR-S obtained from different sources is different in degree, although an important improvement is always obtained. The following table illustrates these differences, using 4% of the processing agent of Example 1 in each case.

*Table II*

| Source of GR-S | | Percent Decrease in Milling Time |
|---|---|---|
| Manufacturer | Lot | |
| A | 1 | 37 |
| B | 1 | 90 |
| B | 3 | 84 |
| B | 4 | 51 |

Other organic compounds of the class disclosed produce similar effects. The following table lists the decrease in milling time obtained with 4% each of several pure compounds and with 4% of the products obtained from these compounds and GR-S. These products were all prepared by the method described above.

*Table III*

| Processing agent | Per Cent Decrease in Milling Time |
|---|---|
| Phenylhydrazine | 32 |
| Product from Phenylhydrazine (1 part)+GR-S (1 part) | 65 |
| Nitroso-beta-Naphthol | 3 |
| Product from Nitroso-beta-Naphthol (1 part)+GR-S (1 part) | 31 |
| Benzoyl Peroxide | 9 |
| Product from Benzoyl Peroxide (1 part)+GR-S (1 part) | 29 |
| "A" [2] | 20 |
| Product from "A" (1 part)+GR-S (1 part) | 21 |
| GR-S [1] | 6 |

[1] In this case, 10 grams of GR-S were refluxed with 500 cc. of benzene for 23.5 hours, during which time a stream of air was bubbled through the solution. 4% of the residue was used.
[2] "A" is 50% of a mixture of aromatic mercaptans (chiefly thio-alpha-naphthol) and 50% of inert oil.

Even the least effective of the products listed in the above table, namely "A"+GR-S, produces a marked effect on the millability, when considered in terms of the amount of mercaptan present, since 2% of mercaptan, as "A," produces a 20% decrease in milling time, while only 1% of mercaptan, as "A"+GR-S, produces a 21% decrease in milling time.

The run in which GR-S alone was treated, as described, shows that such treatment does not, in the absence of other materials, produce a processing agent.

Although the product of Example 6 was not extensively tested, from the tests which were run, and from its appearance, the product appears to be identical with the product of Example 2, although less uniform, which would be expected due to the manner in which the ingredients were mixed together.

The reproducibility of the millability test, as used in obtaining the data given above, is unexpectedly high when tests made on the same day are compared. The mean deviation of 23 check tests, in which the average milling time was 18 minutes, was only 0.8 minute or less than 5%. In the case of the data presented in this specification, both members of every pair of tests were run on the same day.

Years of experience with natural rubber have shown that the plasticity of a rubber sample is a direct measure of its processability. However, this is not true with GR-S, for it has been shown repeatedly that the plasticity of GR-S does not correlate with its millability, or with the power consumption of the masticating machinery.

The data above given with regard to the effectiveness of these new processing agents in decreasing the milling time, is therefore not to be confused with the use of certain of these chemical compounds (not treated according to this invention) in modifying the plasticity of butadiene-styrene elastomers.

The processing materials of this invention may be incorporated with the butadiene-styrene elastomer in an internal mixer, as well as on a rubber mill, and these materials are effective for improving the processability of the butadiene-styrene elastomers at temperatures at between 25° and 150° C., irrespective of how they are incorporated in the elastomers.

The processing agents of this invention, namely, those in which the organic compound has been incorporated with small amounts of the butadiene-styrene elastomer, are preferably employed in improving the processability of the butadiene-styrene elastomers in an amount of from 0.5% to 5.0%, based on the weight of the elastomer being treated. The butadiene-styrene elastomers to which this invention is particularly applicable are those containing from 5% to 60% styrene. As illustrated in the above examples, the use of the processing agents of this invention effect a very large saving in time and in power in the working of butadiene-styrene elastomers. Further savings in time and power are obtained during the compounding of such elastomers which have been treated with these processing agents, particularly during the incorporation of carbon black into such elastomers.

It is of course understood that, where the material is subjected to the action of oxygen, this oxygen may be only that normally present in air, or it may be oxygen itself.

I claim:
1. In the process for preparing processing agents which are particularly useful in the processing of butadiene-styrene elastomers, the step which comprises intimately mixing in a butadiene-styrene elastomer containing from 5% to 60% of styrene from 25% to 200% by weight of a compound of the group consisting of para-nitroso-dimethylaniline, nitroso-beta-naphthol, phenylhydrazine, and thio-alpha-naphthol, and exposing the mixture to oxygen until the mixture becomes a heavy viscous liquid when not diluted by solvents.

2. In the process for preparing processing agents which are particularly useful in the processing of butadiene-styrene elastomers, the steps which comprise making a smooth cement of a butadiene-styrene elastomer containing from 5% to 60% of styrene with an inert organic solvent, adding from 25% to 200% by weight, based on the elastomer employed, of an organic compound of the class consisting of para-nitrosodimethylaniline, nitroso-beta-naphthol, phenylhydrazine, and thio-alpha-naphthol, refluxing the resulting cement in the presence of oxygen for at least three hours, and evaporating off the solvent employed, leaving the processing agent in the form of a heavy, viscous liquid.

3. In the process for preparing processing agents which are particularly useful in the processing of butadiene-styrene elastomers, the steps which comprise making a smooth cement of a butadiene-styrene elastomer containing from 5% to 60% of styrene with an inert organic solvent, adding from 25% to 200% by weight, based on the elastomer employed, of para-nitrosodimethylaniline, refluxing the resulting cement in the presence of oxygen for at least three hours and evaporating off the solvent employed, leaving the processing agent in the form of a heavy, viscous liquid.

4. In the process for preparing processing agents which are particularly useful in the processing of butadiene-styrene elastomers, the steps which comprise making a smooth cement of a butadiene-styrene elastomer containing from 5% to 60% of styrene with an inert organic solvent, adding from 25% to 200% by weight, based on the elastomer employed, of thio-alpha-naphthol, refluxing the resulting cement in the presence of oxygen for at least three hours and evaporating off the solvent employed, leaving the processing agent in the form of a heavy, viscous liquid.

5. In the process for preparing processing agents which are particularly useful in the processing of butadiene-styrene elastomers, the steps which comprise making a smooth cement of a butadiene-styrene elastomer containing from 5% to 60% of styrene with an inert organic solvent, adding from 25% to 200% by weight, based on the elastomer employed, of phenylhydrazine, refluxing the resulting cement in the presence of oxygen for at least three hours and evaporating off the solvent employed, leaving the processing agent in the form of a heavy viscous liquid.

JOHN R. VINCENT.

REFERENCES CITED

The following references are of record in the file of this patent:

UNITED STATES PATENTS

| Number | Name | Date |
| --- | --- | --- |
| 2,217,631 | Wolfe | Oct. 8, 1940 |
| 2,273,506 | Bachle | Feb. 17, 1942 |

FOREIGN PATENTS

| Number | Country | Date |
| --- | --- | --- |
| 538,983 | Great Britain | Aug. 25, 1941 |